US007489695B1

(12) United States Patent
Ayyangar

(10) Patent No.: US 7,489,695 B1
(45) Date of Patent: Feb. 10, 2009

(54) AUTOMATIC LSP STITCHING WITH PROTOCOL SIGNALING

(75) Inventor: Arthi R. Ayyangar, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 763 days.

(21) Appl. No.: 10/963,412

(22) Filed: Oct. 12, 2004

(51) Int. Cl.
*H04L 12/28* (2006.01)
*H04L 12/56* (2006.01)
(52) U.S. Cl. .................. 370/396; 370/401; 709/242
(58) Field of Classification Search .............. None
See application file for complete search history.

(56) References Cited

U.S. PATENT DOCUMENTS

| 2003/0099235 A1 | 5/2003 | Shin et al. |
| 2003/0112748 A1 | 6/2003 | Puppa et al. |
| 2004/0028064 A1* | 2/2004 | Cetin et al. .................. 370/409 |
| 2005/0111351 A1 | 5/2005 | Shen |
| 2005/0141504 A1* | 6/2005 | Rembert et al. ............. 370/392 |
| 2005/0281192 A1 | 12/2005 | Nadeau et al. |
| 2006/0039391 A1* | 2/2006 | Vasseur et al. .............. 370/409 |
| 2006/0153067 A1* | 7/2006 | Vasseur et al. .............. 370/217 |

OTHER PUBLICATIONS

Jean Philippe Vasseur, Arthi Ayyangar, "Inter-region MPLS Traffic Engineering", Jun. 2003, Network Working Group Internet Draft, draft-ayyangar-inter-region-te-00.txt, whole document.*

Jean-Philippe Vasseur, Raymond Zhang, "Inter-AS MPLS Traffic Engineering", Jun. 2003, IETF Internet Draft, draft-vasseur-inter-as-te-01.txt, whole document.*

Adrian Farrel, Dimitri Papadimitriou, Jean-Philippe Vasseur, "Encoding of Attributes for Multiprotocol Label Switching (MPLS) Label Switched Path (LSP) Establishment Using RSVP-TE", Nov. 2003, Network Working Group Internet Draft, draft-ietf-mpls-rsvpte-attributes-00.txt, whole document.*

Kompella K., Rekhter Y., "LSP Hierarchy with Generalized MPLS TE", IETF Internet Draft, draft-ietf-mpls-lsp-hierarchy-08.txt, Mar. 2002, whole document.*

(Continued)

*Primary Examiner*—Chirag G Shah
*Assistant Examiner*—Suk Jin Kang
(74) *Attorney, Agent, or Firm*—Shumaker & Sieffert, P.A

(57) ABSTRACT

Explicit signaling mechanisms facilitate automatic stitching for both packet and non-packet label switched paths (LSPs). Extensions to resource reservation protocol signaling are utilized to include explicit signaling mechanisms that setup and maintain LSPs. An inter-domain LSP may be created by automatically stitching independent LSP segments within separate domains. Stitching the intra-domain LSP segments creates an end-to-end LSP in the data plane with continuous label swapping across the different domains. An intra-domain LSP may be created by automatically stitching independent LSP segment within a single domain. A network device, such as a router, at an ingress of an LSP segment utilizes the signaling extensions to notify a network device at an egress of the LSP segment to prepare for a stitching procedure. In return, the egress network device utilizes the signaling extensions to inform the ingress network device whether the LSP segment is ready for the stitching procedure.

31 Claims, 8 Drawing Sheets

OTHER PUBLICATIONS

Vasseur JP, Ayyangar A., "Label Switched Path Stitching with Generalized MPLS Traffic Engineering", IETF Internet Draft, draft-ietf-ccamp-lsp-stitching-00.txt, Apr. 2005, whole document.*

D. Awduche et al., "RFC 3209—RSVP-TE: Extensions to RSVP for LSP Tunnels," Network Working Group, Dec. 2001, 47 pgs.

RSVP-TE: Resource Reservation Protocol—Traffic Extension, Javvin Company, 2 pgs, printed Feb. 14, 2005.

U.S. Appl. No. 10/860,183, entitled "Constraint-Based Label Switched Path Selection Within A Computer Network," filed Jun. 3, 2004.

U.S. Appl. No. 10/928,572, entitled "Traffic Engineering Using Extended Bandwidth Accounting Information," filed Aug. 27, 2004.

U.S. Appl. No. 10/973,677, entitled "RSVP-Passive Interfaces For Traffic Engineering Peering Links In MPLS Networks," filed Oct. 26, 2004.

Aggarwal et al., "Establishing Point to Multipoint MPLS TE LSPs," submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

* cited by examiner

AUTOMATIC LSP STITCHING WITH PROTOCOL SIGNALING

TECHNICAL FIELD

The invention relates to computer networks and, more particularly, to providing traffic engineering within a network.

BACKGROUND

Routing devices within a network, often referred to as routers, maintain tables of routing information that describe available routes through the network. Upon receiving an incoming packet, the router examines information within the packet and forwards the packet in accordance with the routing information. In order to maintain an accurate representation of the network, routers exchange routing information in accordance with a defined routing protocol, such as the Border Gateway Protocol (BGP).

The term "link" is often used to refer to the connection between two devices on a network. The link may be a physical connection such as a copper wire, a coaxial cable, any of a host of different fiber optic lines or a wireless connection. In addition, network devices may define "virtual" or "logical" links, and map the virtual links to the physical links. In other words, the use of virtual links provides a degree of abstraction.

To avoid link congestion, traffic engineering may be applied within a network for a variety of purposes, such as to route traffic around network failures or congested links. For example, a label switched path (LSP) may be set up in a Multi-Protocol Label Switching (MPLS) network by a resource reservation protocol, such as the Resource Reservation Protocol with Traffic Engineering extensions (RSVP-TE). In this manner, RSVP-TE LSPs may be used to define a path from a source device to a destination device that avoids failures or bottlenecks within the network.

In some cases an LSP spanning multiple domains may be created by "stitching" together independent, intra-domain LSP segments. The term stitching generally refers to binding the end-to-end LSP to the intermediate LSP segments to create the LSP. As a result, the LSP is often referred to as an "end-to-end" LSP that appears as one contiguous LSP, but constitutes multiple LSP segments in actuality. Existing signaling mechanisms for packet-based networks do not to support explicit LSP stitching, and may involve manual configuration.

SUMMARY

In general, techniques are described for automatic stitching of both packet or non-packet label switched path (LSP) segments to form end-to-end LSPs. The techniques provide explicit signaling mechanisms to facilitate the automatic LSP stitching. For example, the explicit signaling mechanisms may be utilized to automatically stitch LSP segments established by a resource reservation protocol, such as the Resource Reservation Protocol with Traffic Engineering extensions (RSVP-TE).

Embodiments of the invention utilize extensions to resource reservation protocol signaling to include explicit signaling mechanisms that setup and maintain LSPs. An inter-domain LSP may, for example, be created by automatically stitching independent LSP segments within separate domains. Stitching the intra-domain LSP segments creates an end-to-end LSP in the data plane having continuous label swapping across the different domains. As another example, an intra-domain LSP may be created by automatically stitching independent LSP segments within a single domain. In general, the techniques may be applied to automatically stitch a first LSP to another LSP.

A network device, such as a router, at an ingress of an LSP segment utilizes the techniques to notify a network device at an egress of the LSP segment to prepare the LSP segment for a stitching procedure. In return, the egress network device also utilizes the techniques to notify the ingress network device when the LSP segment is ready for the stitching procedure. In this manner, an extended protocol supporting the techniques described herein may determine whether a given LSP segment supports the stitching procedure before attempting to stitch an LSP into the LSP segment.

In one embodiment, a method comprises establishing a label switched path (LSP) segment and determining whether the LSP segment supports a stitching procedure. The method further comprises automatically stitching an LSP to the LSP segment when the LSP segment supports the stitching procedure.

In another embodiment, a method comprises receiving a communication from an ingress router of a label switched path (LSP) segment that a stitching procedure is desired with the LSP segment. The method further comprising outputting a communication from an egress router of the LSP segment to inform the ingress router of an ability of the egress router to support the stitching procedure.

In another embodiment, a method comprises outputting a communication from an ingress router of a label switched path (LSP) segment to an egress router of the LSP segment that a stitching procedure is desired with the LSP segment. The method further comprising receiving a communication from the egress router to inform the ingress router of an ability of the egress router to support the stitching procedure.

In a further embodiment, a system comprises an ingress router of a label switched path (LSP) segment, and an egress router of the LSP segment. The egress router executes a protocol that determines whether the LSP segment supports a stitching procedure. When the LSP segment supports the stitching procedure, the protocol executing on the egress router communicates with a protocol executing on the ingress router to automatically stitch an LSP to the LSP segment.

In an additional embodiment, a computer-readable medium comprises instructions that cause a programmable processor to establish a label switched path (LSP) segment and determine whether the LSP segment supports a stitching procedure. The instructions further cause a programmable processor to automatically stitch an LSP to the LSP segment when the LSP segment supports the stitching procedure.

In a further embodiment, a router comprises a signaling protocol and a stitching module. The signaling protocol establishes the router as an egress router within a label switched path (LSP) segment. The stitching module receives a communication from an ingress router of the LSP segment that a stitching procedure is desired with the LSP segment. The stitching module also outputs a communication to inform the ingress router of an ability of the egress router to support the stitching procedure.

In an additional embodiment, a computer-readable medium comprises instructions that cause an egress router of a label switched path (LSP) segment to receive a communication from an ingress router of the LSP segment that a stitching procedure is desired with the LSP segment. The instructions further cause the egress router to output a communication to inform the ingress router of an ability of the egress router to support the stitching procedure.

In a further embodiment, the invention is directed to a router comprising a signaling protocol and a stitching module within the signaling protocol. The signaling protocol establishes the router as an ingress router of a label switched path (LSP) segment. The stitching module outputs a communication to an egress router of the LSP segment that a stitching procedure is desired with the LSP segment. The stitching module also receives a communication from the egress router indicating an ability of the egress router to support the stitching procedure.

In an additional embodiment, the invention is directed to a computer-readable medium comprising instructions that cause an ingress router of a label switched path (LSP) segment to output a communication to an egress router of the LSP segment that a stitching procedure is desired with the LSP segment. The instructions further cause the ingress router to receive a communication from the egress router to inform the ingress router of an ability of the egress router to support the stitching procedure.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
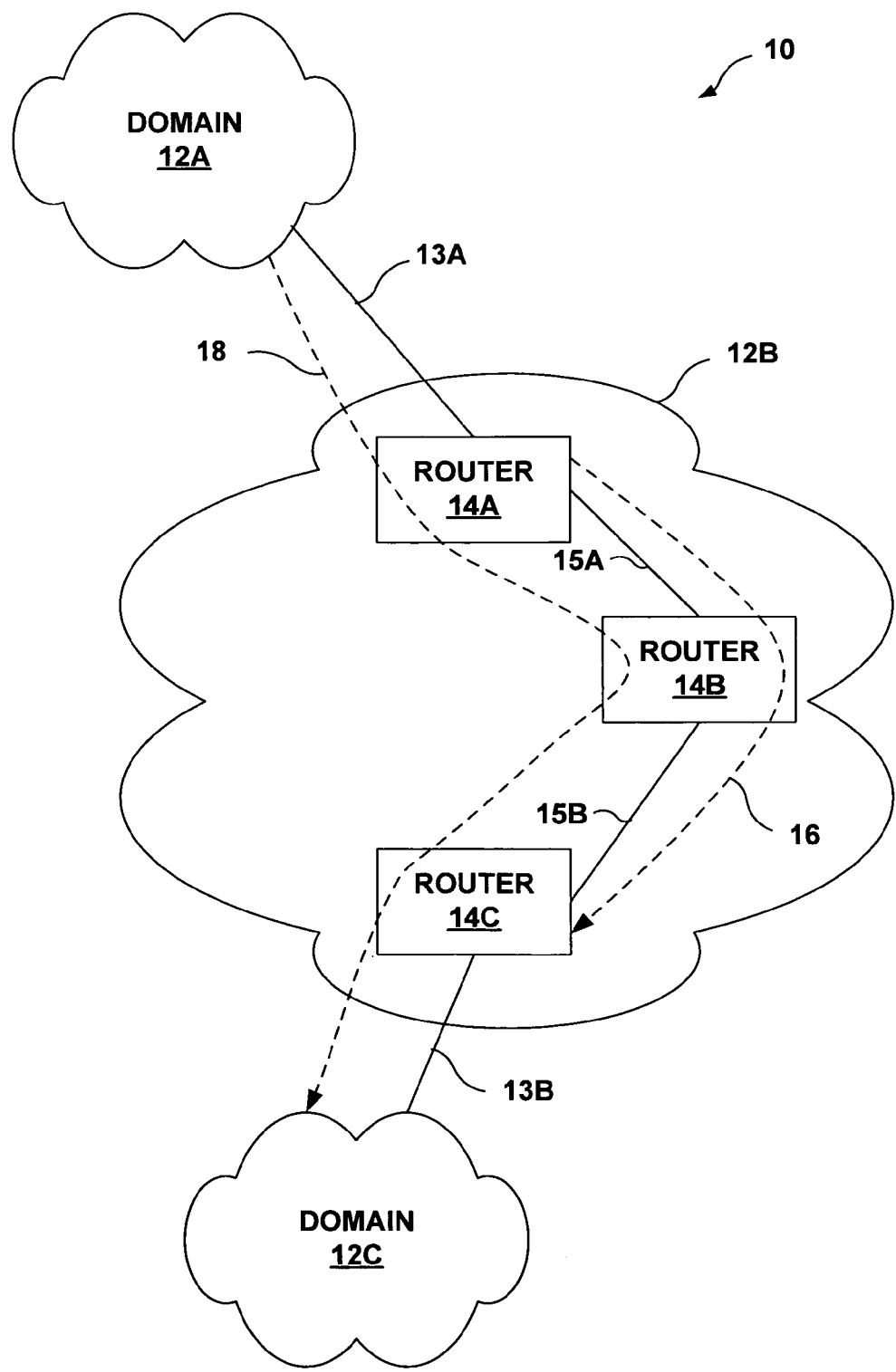
FIG. 1 is a block diagram illustrating a system that utilizes a protocol that has been extended to allow automatic stitching with both packet and non-packet label switched paths (LSPs) consistent with the principles of the invention.

FIG. 1 is a block diagram illustrating a system 10 that utilizes a protocol that has been extended to allow automatic stitching with both packet and non-packet label switched paths (LSPs). For ease of illustration, the techniques will be described in reference to a resource reservation protocol, such as the Resource Reservation Protocol with Traffic Engineering extensions (RSVP-TE), that has been extended to include explicit signaling mechanisms that enable stitching of LSP segments to create an LSP. In other embodiments, the techniques may be applied to extend any other Multi-Protocol Label Switching (MPLS) protocol, e.g., the Label Distribution Protocol (LDP).

In the example of FIG. 1, the explicit signal mechanisms are used to automatically stitch an inter-domain LSP 18 from domain 12A to 12C to an LSP segment 16 within domain 12B. Intra-domain LSP segment 16 may be established by the extended resource reservation protocol or other label distribution protocols extended to incorporate the signaling mechanisms described herein. In other embodiments, the explicit signaling mechanisms may automatically stitch an LSP to an LSP segment within a single domain.

As shown in FIG. 1, system 10 includes domains 12A, 12B, and 12C ("domains 12") that support RSVP-TE. RSVP-TE, for example, is a protocol that enables the reservation of resources and establishment of LSPs for packet flows from a source device to a destination device. Each of domains 12 may comprise any collection of network elements within a common address space, such as an autonomous system (AS) or an Interior Gateway Protocol (IGP) area. The explicit signaling techniques described herein may be applicable to inter-domain MPLS traffic engineering. This may include inter-area and inter-AS MPLS TE, as well as signaling between a Layer 2 (L2) network and an MPLS network. The techniques may also be applicable in stitching L2 LSPs to Pseudo-wires.

Domain 12B includes routers 14A-14C ("routers 14") that are connected by links 15A and 15B ("links 15"). Routers 14 maintain routing information that describes available routes through domain 12B. Upon receiving an incoming packet, routers 14 examine information within the packet and forward the packet in accordance with the routing information. In order to maintain an accurate representation of domain 12B, routers 14 exchange routing information, e.g., bandwidth availability for each of links 15A and 15B, in accordance with a defined routing protocol, such as an Interior Gateway Protocol (IGP).

Router 14A couples domain 12A to domain 12B via link 13A, and router 14C couples domain 12C to domain 12B via link 13B. In some embodiments, one or more of domains 12 may represent a local network including a number of computing devices. Example computing devices include workstations, servers, laptops, personal digital assistants (PDAs), wireless devices, and the like. In other embodiments, one or more of domains 12 may represent an intermediate network coupling local networks. An intermediate network may, for example, be a service provider network that provides access to the Internet or other private or public networks (not shown). Routers 14 may be edge routers, core routers, enterprise routers, or other devices that provide routing functionality.

Domains 12 may support multiple networks and, therefore, may carry packets associated with a variety of protocols. For example, domains 12 may carry traffic associated with reserved bandwidth, e.g., via the RSVP-TE protocol as extended herein, and may carry packets that consume unreserved bandwidth, e.g., Label Distribution Protocol (LDP) or Internet Protocol (IP) traffic. In some embodiments, domains 12 may invoke the extended resource reservation protocol only as needed to traffic engineer an inter-domain LSP around a congested link, and may otherwise primarily carry traffic associated with unreserved bandwidth, e.g., IP traffic and/or LDP traffic.

Intra-domain LSP segment 16 defines a path between an ingress router 14A and an egress router 14C within domain 12B. In the illustrated embodiment, each of ingress router 14A and egress router 14C comprise a border router (BR) of domain 12B and inter-domain LSP 18 extends from domain 12A to domain 12C through domain 12B. In other embodiments, egress router 14C may be the egress router for LSP 18 as well as LSP segment 16. In that case, egress router 14C may not comprise a border router of domain 12B.

LSP segment 16 may be established as a conventional resource reservation protocol packet LSP in which Penultimate Hop Popping (PHP) is the default behavior of routers 14. In that case, when establishing LSP segment 16, router 14B allocates a label and propagates that label to router 14A. Egress router 14C, as the egress for LSP segment 16, allocates a null label and propagates the null label to router 14B. As a result, ingress router 14A installs a route that causes the label received from router 14B to be pushed onto a data packet received for transmission on LSP segment 16. Ingress router 14A then forwards the data packet to router 14B. Router 14B, located directly before egress router 14C, removes (i.e., pops) the existing label from the received data packet and forwards a label-less packet to egress router 14C.

However, if LSP segment 16 is used to stitch LSP 18 from domain 12A to domain 12C, router 14C must allocate a non-null label to LSP segment 16 and a null label to LSP 18 to provide continuous, end-to-end label swapping. The explicit signaling extensions to the resource reservation protocol ensure proper label operations within inter-domain LSP 18 to route traffic to the correct destination. When a stitching procedure is desired with LSP segment 16, ingress router 14A utilizes the extended signaling mechanisms to notify egress router 14C to prepare for stitching. If egress router 14C recognizes the signaling extensions and supports the desired stitching procedure, egress router 14C allocates a non-null label to LSP segment 16 and communicates the non-null label to router 14B. In addition, egress router 14C utilizes the extended signaling mechanisms to notify ingress router 14A that LSP segment 16 is ready for the stitching procedure. In this manner, the extended signaling mechanisms may be used to determine whether LSP segment 16 supports the stitching procedure before attempting to stitch inter-domain LSP 18 into intra-domain LSP segment 16, and to prepare LSP segment 16 for the subsequent stitching procedure.

In some cases, egress router 14C may not support the extended signaling mechanisms. In that case, egress router 14C may ignore the stitching desired message received from ingress router 14A. In other cases, egress router 14C may recognize the extended signaling and not support the stitching procedure. Egress router 14C may then send an error message to notify ingress router 14A that the stitching procedure is unsupported. In both cases, egress router 14C does not respond with a stitching ready message, preventing ingress router 14A from using LSP segment 16 for stitching.

Ingress router 14A processes a subsequent setup message for establishing inter-domain LSP 18 based on whether LSP segment 16 supports stitching. Specifically, if ingress router 14A has been notified that LSP segment 16 supports stitching, ingress router 14A automatically forwards the setup message along the path. In response, egress router 14C determines whether it is an egress router for the LSP to be created, i.e., inter-domain LSP 18 in this example. In that case, egress router 14C allocates a null label and communicates the null label to the preceding router to prompt PHP at router 14B.

In the embodiment illustrated in FIG. 1, egress router 14C is not the egress router of LSP 18. In this case, egress router 14C installs a route to swap the non-null label allocated to LSP segment 16 to a label of a subsequent router in domain 12C. In addition, ingress router 14A allocates a label, communicates the label to a preceding router in domain 12A, and installs a route to swap the allocated label to the label received from router 14B. In this way, inter-domain LSP 18 may be automatically stitched to LSP segment 16 and appear as one contiguous LSP.

Figure 2:
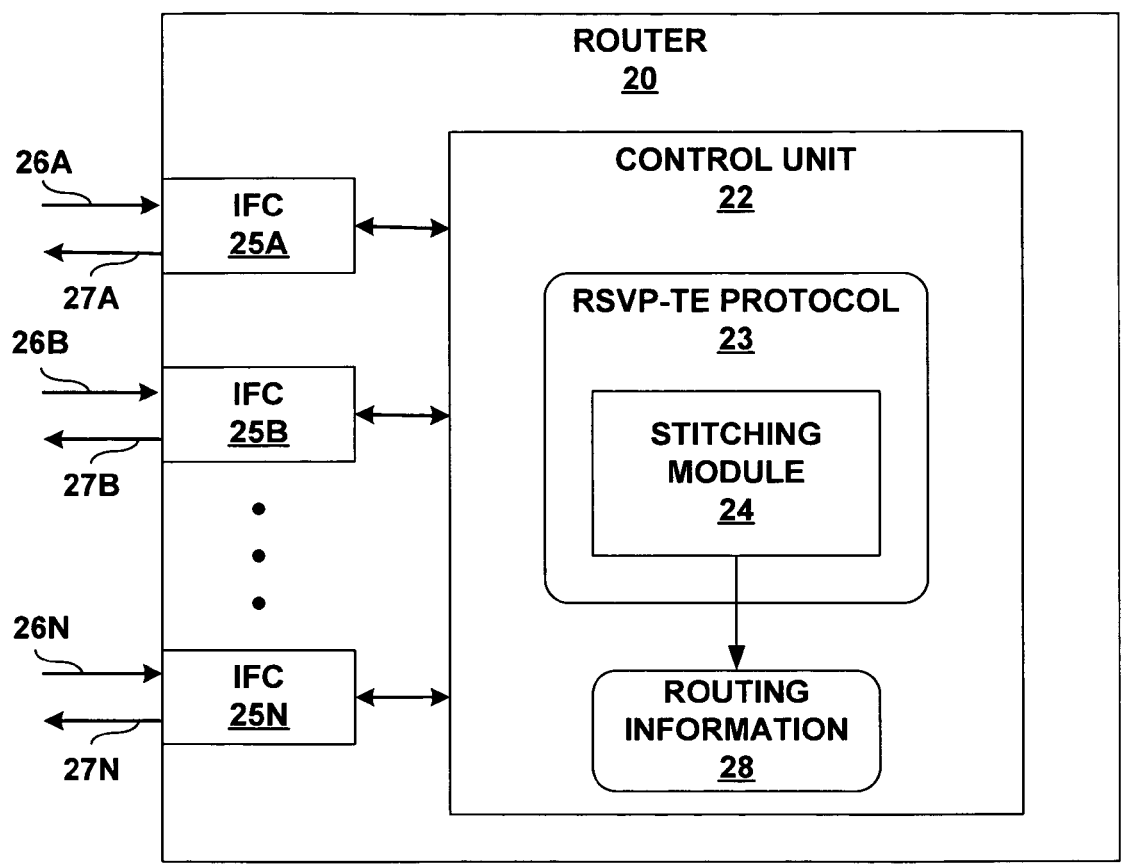
FIG. 2 is a block diagram illustrating an exemplary router which utilizes a protocol that has been extended to include explicit signaling mechanisms that allow automatic stitching of LSP segments.

FIG. 2 is a block diagram illustrating an exemplary router 20 which utilizes a protocol that has been extended to include explicit signaling mechanisms that allow automatic stitching of LSP segments. Router 20 may, for example, represent any of routers 14 of FIG. 1.

In the example embodiment of FIG. 2, router 20 includes a set of interface cards (IFCs) 25A-25N ("IFCs 25") for communicating packets via inbound links 26A-26N ("inbound links 26") and outbound links 27A-27N ("outbound links 27"). Router 20 further comprises a control unit 22 that maintains routing information 28. Routing information 28 describes the topology of a network, such as domain 12B of FIG. 1, and, in particular, routes through the network. Routing information 28 may include, for example, route data that describes various routes within the network, and corresponding next hop data indicating appropriate neighboring devices within the network for each of the routes. Router 20 updates routing information 28 to accurately reflect the topology of the network. In general, when router 20 receives a packet via one of inbound links 26, control unit 22 determines a destination and associated next hop for the packet in accordance with routing information 28 and outputs the packet on one of outbound links 27 based on the destination.

In the example of FIG. 2, control unit 22 provides an operating environment for a resource reservation protocol 23 ("RSVP-TE protocol 23") executing within control unit 22. In other embodiments, other protocols may be executed within control unit 22, such as the LDP protocol. RSVP-TE protocol 23 receives resource reservation requests from other routing devices, and reserves the requested bandwidth on outbound links 27 for RSVP-TE traffic. In the event traffic needs to be rerouted around a network failure or a congested link, for example, a system administrator or software agent invokes RSVP-TE protocol 23 to traffic engineer a new path through the network and establish the LSP. Although described for exemplary purposes in reference to RSVP-TE, the principles described herein may by applied to extend other protocols, such as different constraint-based routing protocols.

As illustrated in FIG. 2, RSVP-TE protocol 23 has been extended to include a stitching module 24. Consistent with the principles of the invention, stitching module 24 provides explicit signaling mechanisms for carrying out LSP stitching operations. In certain embodiments, the stitching operations may be carried out automatically, i.e., without intervention by a system administrator or a software agent.

As an example, router 20 may comprise an egress router of an intra-domain RSVP-TE LSP segment, e.g., egress router 14C of FIG. 1. In that case, router 20 may receive a message from an ingress router of the LSP segment indicating that stitching is desired for the LSP in accordance with the extended RSVP-TE signaling mechanisms described herein. The PATH message may, for example, include a stitching desired bit. Stitching module 24 recognizes the stitching desired bit and, in response, allocates a non-null label and communicates the non-null label to a preceding router along the LSP segment (e.g., router 14B of FIG. 1) in a reservation ("RESV") message for the LSP segment. The RESV message also includes a stitching ready bit that, upon receipt by the ingress router, notifies the ingress router that the stitching procedure is supported.

Once the ingress router receives the RESV message, the ingress router may forward an inter-domain LSP setup message to router 20. In order to provide continuous label swapping between router 20 and a subsequent router in another domain (e.g., domain 12C), stitching module 24 allocates a null label to the LSP being created. RSVP-TE protocol 23 updates routing information 28 to install a route to swap the non-null label allocated to the LSP segment by stitching module 24 to a label allocated by the subsequent router. RSVP-TE protocol 23 stores the route in routing information 28 to accurately reflect the topography of the network. However, in the event router 20 is also the egress router of the inter-domain LSP being created, stitching module 24 allocates a null label to the LSP segment and RSVP-TE protocol 23 does not install a new route.

In the case where stitching module 24 recognizes the stitching desired bit, but router 20 cannot support the requested stitching procedure, stitching module 24 generates an error message with a "routing problem" error code extended to include a "stitching unsupported" sub-code. In that case, stitching module 24 does not set the stitching ready bit in the RESV message sent to the ingress router. Therefore, the ingress router will not perform automatic stitching with the LSP segment.

As another example, router 20 may comprise an ingress router of an intra-domain RSVP-TE LSP segment, e.g., ingress router 14A of FIG. 1. In that case, router 20 may receive notification that stitching is desired for a given LSP segment statically from a system administrator or dynamically from another device. Stitching module 24 then generates a PATH message using RSVP-TE signaling extended as described herein. Router 20 sends the PATH message to an egress router of the LSP segment via one of outbound links 27. Stitching module 24 sets a stitching desired bit in the PATH message to notify the egress router to prepare for a stitching procedure. If the egress router supports stitching, router 20 receives a RESV message in which the stitching ready bit is set. In cases where the stitching ready bit is not set in the RESV message, stitching module 24 directs router 20 to not allow stitching with the LSP segment.

If, however, router 20 receives a RESV message with an enabled stitching ready bit, router 20 allows automatic stitching with the LSP segment. Specifically, in response to an inter-domain LSP setup message, stitching module 24 allocates a label for the LSP segment and communicates the label to a router or other device in the preceding domain, e.g., domain 12A. RSVP-TE protocol 23 then updates routing information 28 to install a route to swap the label allocated by stitching module 24 to a label of a subsequent router in the LSP segment, e.g., router 14B.

Router 20 may receive data indicative of which other routers in the network support the extended resource reservation protocol described herein. If a router along the path engineered by RSVP-TE protocol 23 does not support the extended resource reservation protocol, RSVP-TE protocol 23 may avoid that router when establishing the end-to-end LSP.

The architecture of router 20 illustrated in FIG. 2 is shown for exemplary purposes only. The invention is not limited to this architecture. In other embodiments, router 20 may be configured in a variety of ways. In one embodiment, for example, control unit 22 and its corresponding functionality may be distributed within IFCs 25. In another embodiment, control unit 22 may include a routing engine that performs routing functions and maintains a routing information base (RIB), e.g., routing information 28, and a forwarding engine that performs packet forwarding based on a forwarding information base (FIB) generated in accordance with the RIB.

Control unit 22 may be implemented solely in software, or hardware, or may be implemented as a combination of software, hardware, or firmware. For example, control unit 22 may include one or more processors which execute software instructions. In that case, the various software modules of control unit 22, such as RSVP-TE protocol 23 and stitching module 24, may comprise executable instructions stored on a computer-readable medium, such as computer memory or hard disk.

Figure 3:
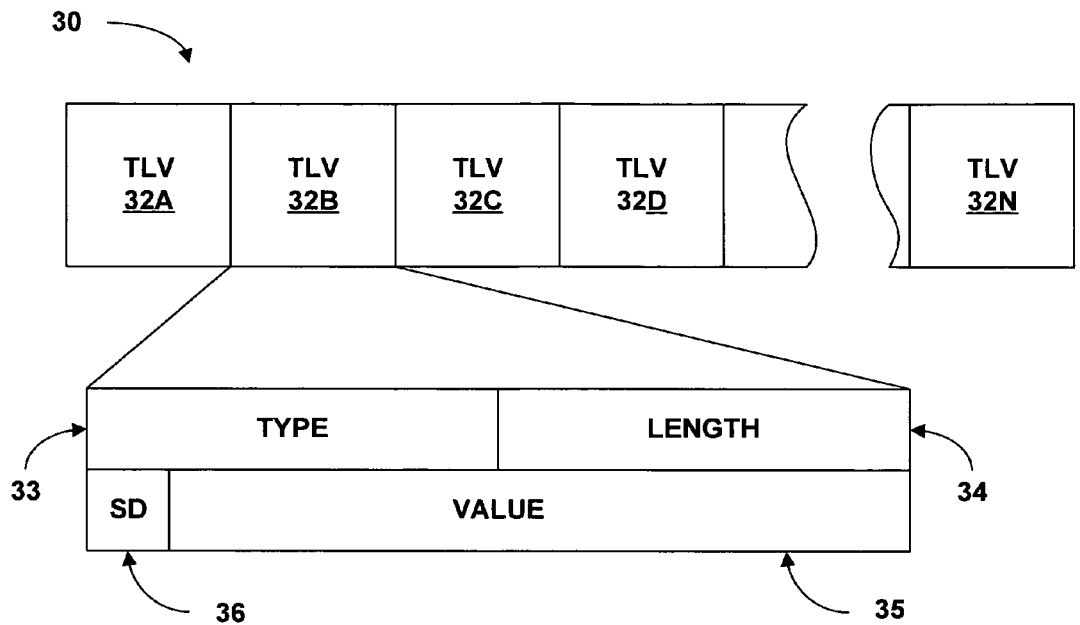
FIG. 3 is a diagram illustrating an object of a protocol extended as described herein.

FIG. 3 is a diagram illustrating an exemplary object 30 of a resource reservation protocol, such as RSVP-TE, that has been extended to support explicit LSP stitching as described herein. Object 30 may, for example, comprise an LSP_Attributes object included in a PATH message from a router in association with an RSVP-TE LSP. Object 30 is used to signal attributes required to support the LSP or to indicate a nature of the LSP.

Object 30 is constructed from type-length-value (TLV) fields 32A-32N ("TLVs 32"). TLV 32B, for example, comprises a type field 33, a length field, 34, and a value field 35. In the illustrated embodiment, type field 33 identifies TLV 32B as an Attributes Flags TLV. Length field 34 specifies the length of value field 35 in bytes. Value field 35 carries data as a variable series of bit flags. As illustrated, the RSVP-TE protocol has been extended in that Attributes Flags TLV 32B includes a stitching desired bit (SD in FIG. 3) 36. Each of TLVs 32 may comprise fields similar to those illustrated for TLV 32B.

An ingress router sets stitching desired bit 36 to indicate that a specified LSP segment is to be readied for LSP stitching. If an egress router of an LSP segment recognizes stitching desired bit 36 and supports the desired stitching procedure, the egress router allocates a non-null label to the LSP segment. The egress router outputs a RESV message specifying the non-null label and including a stitching ready bit to notify the ingress router of the LSP segment that the stitching procedure is supported.

Figure 4:
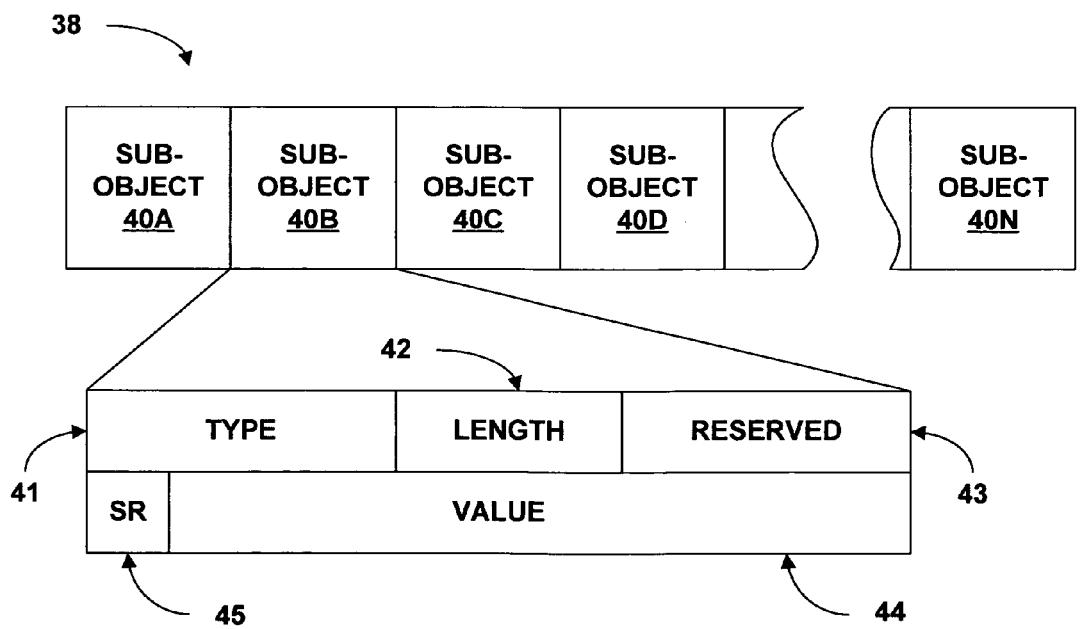
FIG. 4 is a diagram illustrating a record route object (RRO) of a protocol extended as described herein.

FIG. 4 is a diagram illustrating a record route object (RRO) 38 of a resource reservation protocol, such as RSVP-TE, that has been extended as described herein. RRO 38 may be included in a RESV message generated by a router in association with an RSVP-TE LSP. Specifically, RRO 38 is used to record an IP address and/or a label of each router associated with the LSP.

RRO 38 is constructed from sub-objects 40A-40N ("sub-objects 40"). Sub-object 40B, for example, comprises a type field 41, a length field, 42, a reserved field 43, and a value field 44. In the illustrated embodiment, type field 41 is used to identify sub-object 40B as an RRO Attributes sub-object. Length field 42 specifies the length of value field 44 in bytes. Value field 44 carries data as a variable series of bit flags. Reserved field 43 comprises a one-to-one correspondence between bits in an Attributes Flags TLV, described in FIG. 3, and a RRO Attributes sub-object. Any of sub-objects 40 may comprise fields similar to those illustrated for sub-object 40B.

The RSVP-TE protocol has been extended in that sub-objects 40 or the RRO Attributes type, e.g., sub-object 40B, include a stitching ready bit (SR in FIG. 4) 45 corresponding to stitching desired bit 36 from FIG. 3. In other words, in this example, stitching ready bit 45 is defined for RRO Attributes sub-object 40B in RRO 38. An egress router of an LSP segment sets stitching ready bit 45 in RRO Attributes sub-object 40B (or any other of sub-objects 40 of similar type) to notify an ingress router of the LSP segment that the stitching procedure is supported.

Figure 5:
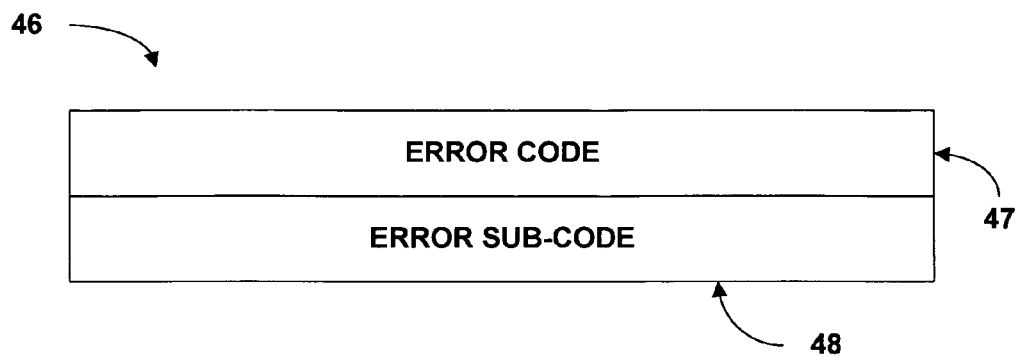
FIG. 5 is a diagram illustrating an error message of a protocol extended as described herein.

FIG. 5 is a diagram illustrating an error message 46 of a resource reservation protocol, such as RSVP-TE, that has been extended as described herein. Error message 46 may comprise a path error message from a router within an RSVP- TE LSP. Error message 46 alerts routers in the LSP that an error occurred when forwarding a PATH message along the LSP.

An egress router of an LSP segment receives a PATH message from an ingress router of the LSP segment that includes the stitching desired bit in the LSP_Attributes object, described in FIG. 3. If the egress router supports the LSP_Attributes object and the Attributes Flags TLV and recognizes the stitching desired bit, but cannot support the requested stitching procedure, then the egress router sends error message 46 back to the ingress router. In this case, error message 46 comprises an error code 47 and an error sub-code 48. In one embodiment, error code 47 comprise a "routing problem" error code with a "stitching unsupported" error sub-code 48.

Figure 6:
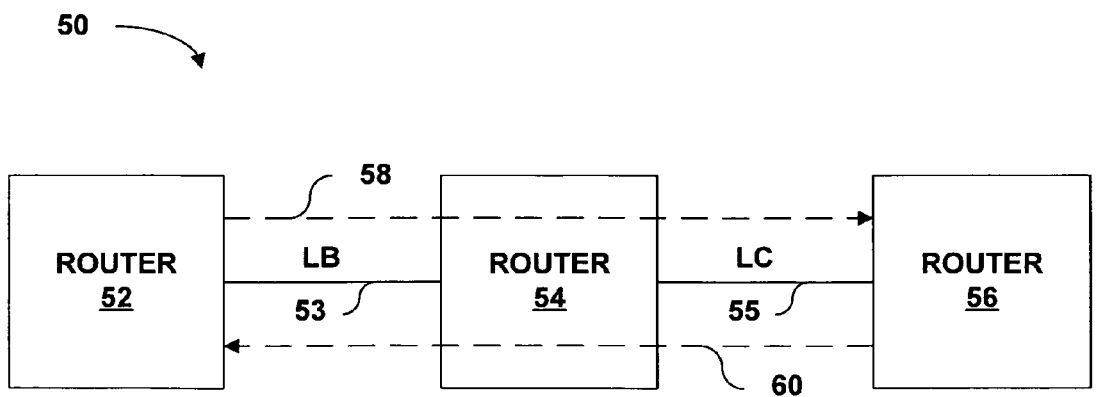
FIG. 6 is a block diagram illustrating an LSP segment signaled by an extended protocol.

FIG. 6 is a block diagram illustrating the establishment of an LSP segment 50 in accordance with the extended protocol described herein. LSP segment 50 may comprise an intra-domain LSP segment, similar to LSP segment 16 in FIG. 1. In this example, LSP segment 50 spans a router 52, a router 54 and a router 56. Router 52 is coupled to router 54 by link 53. Router 54 is coupled to router 56 by link 55. In the illustrated embodiment, router 52 comprises an ingress router of LSP segment 50 and router 56 comprises an egress router of LSP segment 50.

The resource reservation protocol signaling, such as RSVP-TE signaling, includes a PATH message 58 and a reservation (RESV) message 60. PATH and RESV messages 58 and 60 are used to establish and maintain RSVP-TE LSP 50. As illustrated, PATH message 58 propagates along LSP segment 50 from ingress router 52 to egress router 56. In other embodiments, PATH message 58 may be sent from any of the routers in LSP segment 50. When PATH message 58 is received at each router in LSP segment 50, the router determines the next hop of the message from routing information stored by the router. RESV message 60 is illustrated as propagating from egress router 56 to ingress router 52. However, any router within LSP segment 50 may send RESV message 60. Similar to PATH message 58, RESV message 60 is directed along LSP segment 50 based on routing information stored by each of the routers.

Once LSP segment 50 has been established by the resource reservation protocol, router 54 allocates a label LB and propagates the label LB in a RESV message to ingress router 52. Ingress router 52 may then push label LB onto messages traversing LSP segment 50. In the case where LSP segment 50 comprises a packet LSP, egress router 56 allocates a null label to prompt penultimate hop popping (PHP) at router 54. Therefore, router B removes or pops the label LB from the message and forwards the label-less message to egress router 56.

In the illustrated embodiment, the protocol has been extended to include explicit signaling mechanisms that enable automatic stitching with intra-domain LSP segments to create inter-domain LSPs. For example, PATH message 58 from ingress router 52 may include a stitching desired bit that notifies egress router 56 to prepare LSP segment 50 for a stitching procedure. If egress router 56 recognizes the extended bit and supports the desired stitching procedure, egress router 56 generates RESV message 60 to include a non-null label, LC, and a stitching ready bit. Egress router 56 communicates the label LC to router 54 via RESV message 60, which replaces any previously communicated null label, to enable proper label actions to occur once an inter-domain LSP is stitched into LSP segment 50. Moreover, egress router 56 sets the stitching ready bit in RESV message 60 to notify ingress router 52 that LSP segment 50 supports the stitching procedure. Ingress router 52 may then allow LSP segment 50 to be stitched into an inter-domain LSP.

Figure 7:
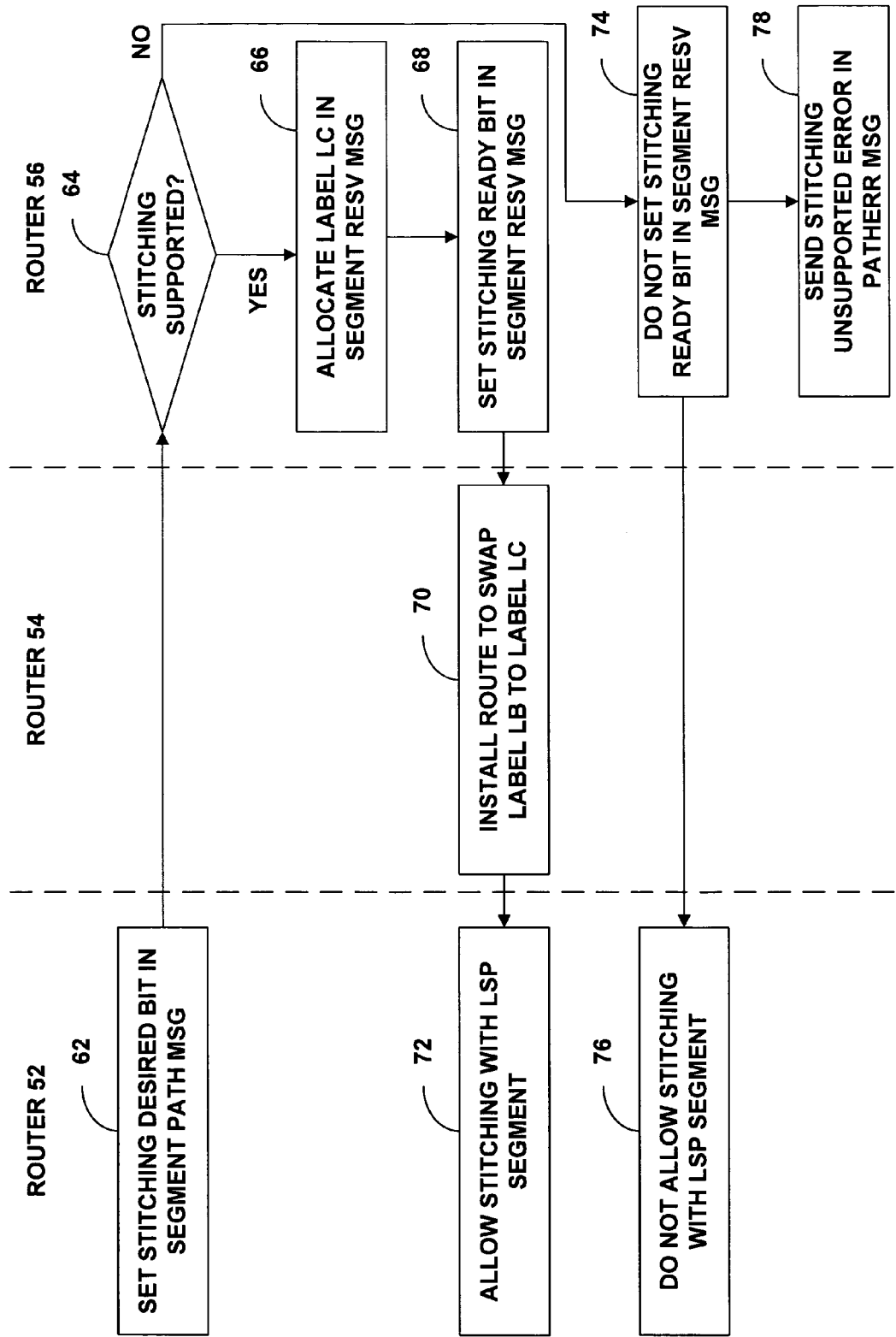
FIG. 7 is a flow chart illustrating a method of preparing an LSP segment for a stitching procedure.

FIG. 7 is a flow chart illustrating in further detail a method of preparing an LSP segment for a stitching procedure. The method may, for example, be applied to prepare LSP segment 50 (FIG. 6) for LSP stitching. Router 52 comprises an ingress router of LSP segment 50 and router 56 comprises an egress router of LSP segment 50. A system administrator or network device may prompt router 52 to prepare LSP segment 50 for a stitching procedure. For example, an inter-domain LSP may be desired, and the system administrator or network device may request the existing LSP segment 50 be prepared for use in the inter-domain LSP. In other cases, LSP segment 50 may be requested to prepare for use in an intra-domain LSP.

In general, routers 52-54 utilize an extended protocol, such as RSVP-TE extended as described herein, to signal LSP segment 50 using the extended PATH message 58 and RESV message 60. Specifically, router 52 sets a stitching desired bit in PATH message 58 and issues the PATH message along LSP segment 50 to router 56 (62). If router 56 receives PATH message 58 but does not support the extended protocol, the router ignores the stitching desired bit (no branch of 64).

If, however, router 56 receives PATH message 58 and a stitching module within router 56 supports the extended protocol and recognizes the stitching desired bit (yes branch of 64), router 56 allocates a non-null label LC in RESV message 60 of LSP segment 50 (66). Router 56 also sets a stitching ready bit in RESV message 60 to notify router 52 that LSP segment 50 supports the stitching procedure (68). Router 54 receives the allocated label LC in RESV message 60. Router 54 then installs a route for swapping label LB (previously allocated by router 54) with label LC (70). The new route is stored in routing information such that when router 54 receives an LSP packet with a label LB, router 54 will swap the label LB to label LC and forward the message to router 56. RESV message 60 then propagates to router 52. A stitching module within router 52 recognizes the stitching ready bit within the RESV message 60 and records the fact that LSP segment 50 has successfully been prepared for stitching (72).

If the stitching procedure is not supported (no branch of 64), router 56 does not set the stitching ready bit in RESV message 60 (74). Router 56 may also generate a path error (patherr) message with a routing problem error code and a stitching unsupported error sub-code. Router 56 then sends the stitching unsupported error in the patherr message to router 52 (78). RESV message 60 and the patherr message propagate to router 52. The stitching module within router 52 recognizes that the stitching ready bit is not set in RESV message 60 and records the fact that LSP segment 50 cannot be automatically stitched to support an end-to-end LSP (76).

Figure 8:
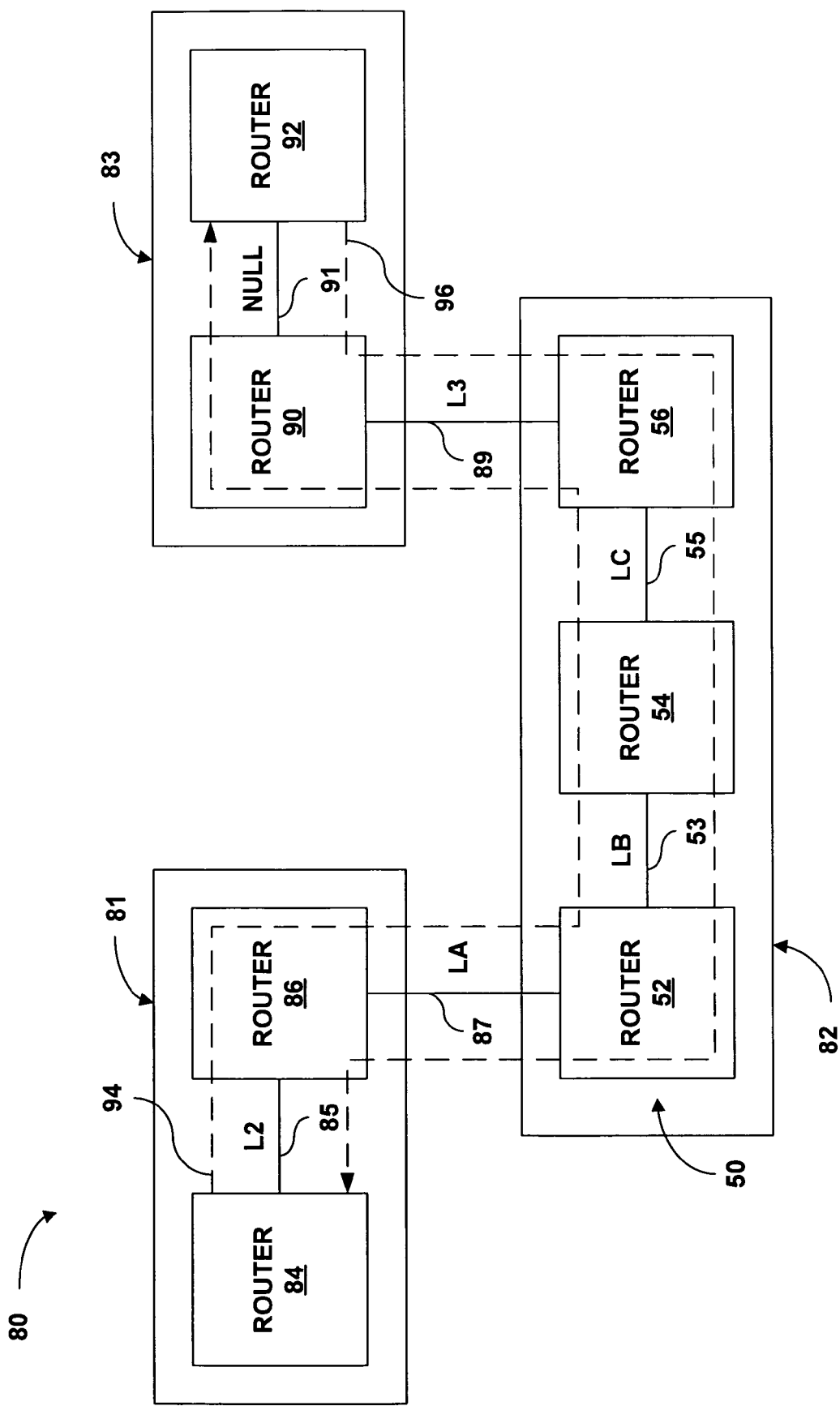
FIG. 8 is a block diagram illustrating an inter-domain LSP automatically stitched into an intra-domain LSP segment consistent with the principles of the invention.

FIG. 8 is a block diagram illustrating an inter-domain LSP 80 automatically stitched into an intra-domain LSP segment 50 from FIG. 6. LSP 80 traverses a first domain 81, a second domain 82, and a third domain 83. First domain 81 includes a router 84 and a router 86 connected by link 85. Third domain 83 includes a router 90 and a router 92 connected by link 91. Second domain 82 includes LSP segment 50, which, as described above, has been prepared for a stitching procedure. First domain 81 couples to second domain 82 via link 87 and second domain 82 couples to third domain 83 via link 89. In some cases, links 87 and 89 may comprise peering links between separate networks.

As described above, LSP segment 50 has been signaled by a protocol that has been extended to allow automatic stitching for either packet or non-packet LSPs, depending on the type of network communications supported in second domain 82. Specifically, LSP segment 50 comprises an intra-domain LSP segment within second domain 82, and has been prepared for stitching in the manner described in reference to FIGS. 6 and 7.

In this example, end-to-end LSP 80 is signaled using PATH message 94 and RESV message 96. In other words, PATH and RESV messages 94 and 96 are used to establish LSP 80. As illustrated, PATH message 94 propagates along LSP 80 from ingress router 84 to egress router 92. In other embodiments, PATH message 94 may be sent from any of the routers in LSP 80. RESV message 96 is illustrated as propagating from egress router 92 to ingress router 84. However, any router within LSP 80 may send RESV message 96. Similar to PATH message 94, RESV message 96 is directed along LSP 80 based on routing information stored by each of the routers.

During this process, router 52 receives PATH message 94 from ingress router 84, via router 86, indicating that inter-domain LSP 80 from router 84 to router 92 is to be automatically established by stitching to an available LSP segment. Since, in this example, router 52 has been notified by router 56 that LSP segment 50 is ready for stitching, router 52 maps PATH message 94 to LSP segment 50 and then forwards the PATH message 94 to router 56. Upon receiving PATH message 94, router 56 performs a check to determine if it is the egress router for inter-domain LSP 80. In the embodiment illustrated in FIG. 8, router 56 is not the egress router for LSP 80. Therefore, router 56 forwards PATH message 94 to egress router 92 via router 90.

In response, egress router 92 allocates a null label to router 90 to enable PHP, and outputs RESV message 96. Router 90 allocates a label L3 in RESV message 96 to router 56. Router 56 then installs a route to swap label LC, allocated to LSP segment 50, for label L3 on any data packets received via LSP segment 50. Router 56 then allocates a null label in RESV message 96 to LSP 80 to avoid double labeling since LSP segment 50 has already been established. This process continues, and router 52 allocates a label LA to router 86 in RESV message 96. Router 52 then installs a route to swap label LA to label LB, allocated upon initial establishment of LSP segment 50, on incoming data packets associated with LSP 80. Router 86 allocates a label L2 to ingress router 84 in RESV message 96. Router 86 installs a route to swap label L2 to label LA on received data packets associated with LSP 80. In this way, inter-domain LSP 80 is stitched using intra-domain LSP segment 50 and appears as one contiguous LSP. In general, the techniques used in this manner to automatically stitch a first LSP to a second LSP. For example, an intra-domain LSP may be automatically stitched into intra-domain LSP segment 50 in a substantially similar manner.

When ingress router 84 receives a data packet intended for transmission along inter-domain LSP 80, router 84 pushes label L2 onto the data packet and forwards the data packet to router 86 via link 85. Router 86 then determines the next hop for the received data packet from routing information stored by router 86. Router 86 swaps label L2 to label LA in accordance with the installed route in the routing information and forwards the data packet to router 52 via link 87. Router 52 swaps label LA to label LB according to the installed route associated with LSP segment 50, and forwards the data packet to router 54 via link 53. Router 54 checks the stored routing information and swaps label LB to label LC. Router 54 then forwards the data packet to router 56 via link 55. Router 56 swaps label LC to label L3 based on the routing information and forwards the data packet to router 90 via link 89. Router 90 comprises the penultimate router in LSP 80 and performs PHP on the data packet to remove label L3. Router 90 then forwards the label-less data packet to egress router 92 via link 91.

Figure 9:
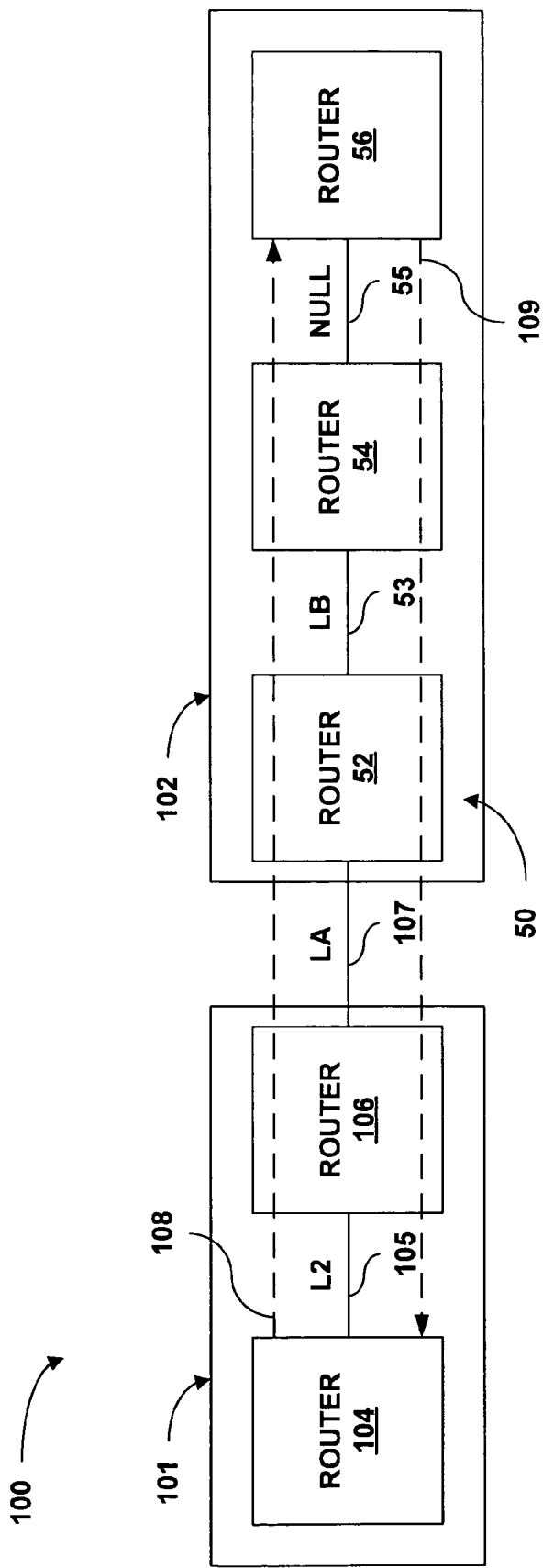
FIG. 9 is a block diagram illustrating another inter-domain LSP automatically stitched into an intra-domain LSP segment consistent with the principles of the invention.

FIG. 9 is a block diagram illustrating another exemplary inter-domain LSP 100 automatically stitched into an intra-domain LSP segment 50 from FIG. 6, where the LSP segment terminates the inter-domain LSP. In this example, LSP 100 traverses a first domain 101 and a second domain 102. First domain 101 includes a router 104 and a router 106 connected by link 105. Second domain 102 includes LSP segment 50, which, as described above, is prepared to perform a stitching procedure. First domain 101 couples to second domain 102 via link 107. In some cases, link 107 may comprise a peering link.

LSP 100 is signaled by an extended resource reservation protocol, such as RSVP-TE, utilizing a PATH message 108 and a RESV message 109. PATH and RESV messages 108 and 109 are used to establish and maintain LSP 100. As illustrated, PATH message 108 propagates along LSP 100 from ingress router 104 to egress router 56. In other embodiments, PATH message 108 may be sent from any of the routers in LSP 100. RESV message 109 is illustrated as propagating from egress router 56 to ingress router 104. However, any router within LSP 100 may send RESV message 109.

During this process, router 52 receives PATH message 108 from ingress router 104, via router 106, indicating that an end-to-end, inter-domain LSP 100 from router 104 to router 56 is requested. Since, in this example, router 52 has been notified by router 56 that LSP segment 50 is ready for automatic stitching, router 52 maps PATH message 108 to LSP segment 50 and then forwards PATH message 108 to router 56.

Upon receiving PATH message 108, router 56 performs a check to determine if it is also the egress router for inter-domain LSP 100. In the embodiment illustrated in FIG. 9, router 56 is the egress router for LSP 100. Therefore, egress router 56 allocates a null label to LSP segment 50 to prompt PHP at preceding router 54. Router 56 also allocates a null label in RESV message 109 to LSP 100. Router 52 allocates a label LA to router 106 in RESV message 109. Router 52 then installs a route to swap label LA to label LB, allocated upon establishment of LSP segment 50, on incoming data packets. Router 106 allocates a label L2 to ingress router 104 in RESV message 109. Router 106 installs a route to swap label L2 to label LA on received data packets associated with LSP 100. In this way, inter-domain LSP 100 is stitched using intra-domain LSP segment 50 and appears as one contiguous end-to-end LSP. In other embodiments, an intra-domain LSP may be automatically stitched into intra-domain LSP segment 50 in a substantially similar manner.

When ingress router 104 receives a data packet intended for transmission along inter-domain LSP 100, router 104 pushes label L2 onto the data packet and forwards the data packet to router 106 via link 105. Router 106 then determines the next hop for the received data packet from routing information stored by router 106. Router 106 swaps label L2 to label LA, in accordance with the installed route in the routing information, and forwards the data packet to router 52 via link 107. Router 52 swaps label LA to label LB according to the installed route and forwards the data packet to router 54 via link 53. Router 54 comprises the penultimate router in LSP 100 and performs PHP on the data packet to remove label LB. Router 54 then forwards the label-less data packet to egress router 56 via link 55.

Figure 10:
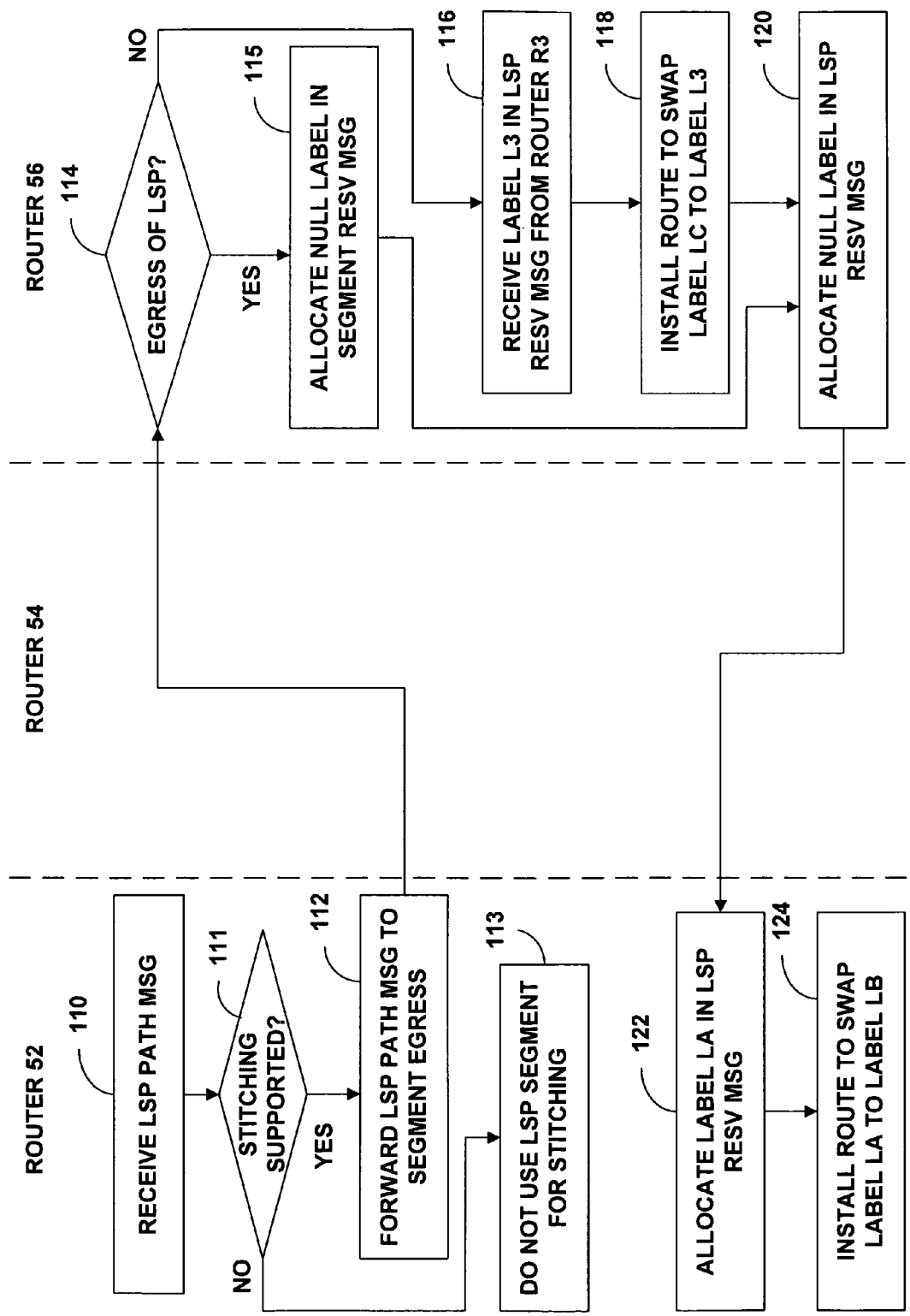
FIG. 10 is a flow chart illustrating a stitching procedure to automatically stitch an inter-domain LSP to an intra-domain LSP segment.

FIG. 10 is a flow chart illustrating an exemplary stitching procedure employed by routers 52-54 to automatically stitch an inter-domain LSP to an intra-domain LSP segment. The procedure may be applied, for example, to establish LSP 80 (FIG. 8) or LSP 100 (FIG. 9) using LSP segment 50 from FIG.

6. In other embodiments, the procedure may be applied to establish an intra-domain LSP using LSP segment 50. As described above, LSP segment 50 has been signaled by an extended protocol to allow automatic stitching for packet or non-packet LSPs.

Router 52 receives a PATH message originated by an ingress router (e.g., router 84 in FIG. 8 or router 104 in FIG. 9) requesting an inter-domain LSP (110). In response, router 52 determines whether stitching is supported on LSP segment 50 (111). If router 52 has not received notification from router 56 that stitching is ready or if router 52 has received a "stitching unsupported" error message (no branch of 111), router 52 does not allow stitching with LSP segment 50 (113). If router 52 has been notified by router 56 that LSP segment 50 is ready for stitching (yes branch of 111), router 52 maps the PATH message to LSP segment 50 and then forwards the PATH message to router 56 (112).

Upon receiving the PATH message, router 56 performs a check to determine if it is also the egress router for the inter-domain LSP (114). If router 56 is not the egress router for the LSP, as illustrated in the example of FIG. 8 (no branch of 114), router 56 receives a label L3 allocated by router 90 in RESV message 96 (116). Router 56 then installs a route to swap label LC, allocated to LSP segment 50, to label L3 on received data packets (118). Router 56 allocates a null label in RESV message 96 to LSP 80 to avoid double labeling (120). Router 52 allocates a label LA to router 86 in RESV message 96 (122). Router 52 then installs a route to swap label LA to label LB, allocated upon establishment of LSP segment 50, on incoming data packets (124).

If router 56 is the egress router for the LSP, as illustrated in the example of FIG. 9 (yes branch of 114), egress router 56 allocates a null label in a RESV message to LSP segment 50 to prompt PHP at preceding router 54 (115). Router 56 also allocates a null label in RESV message 109 to LSP 100 (120). Router 52 allocates a label LA to router 106 in RESV message 109 (122). Router 52 then installs a route to swap label LA to label LB, allocated upon establishment of LSP segment 50, on incoming data packets (124).

In either case, the resource reservation protocol signaling extensions described herein allow automatic stitching of an inter-domain LSP into an intra-domain LSP segment. As another example, the techniques may readily be applied to stitch an intra-domain LSP to one or more LSP segments to span a single domain. Although illustrated for ease of illustration in reference to a single LSP segment, the techniques may readily be applied to stitch an end-to-end, LSP to multiple LSP segments. The explicit signaling mechanisms described herein enable both packet and non-packet LSP segments to be stitched to create an end-to-end LSP with continuous label swapping.

Various embodiments of the invention have been described. These and other embodiments are within the scope of the following claims.

The invention claimed is:

1. A method comprising:
  receiving, in accordance with a signaling protocol, a communication from an ingress router of a label switched path (LSP) segment, the communication indicating that a stitching procedure is desired with the LSP segment to automatically stitch an LSP to the LSP segment; and
  outputting, in accordance with the signaling protocol, a communication from an egress router of the LSP segment, the communication from the egress router comprising both: (i) a non-null label allocated to the LSP segment from the egress router, and (ii) an explicit signaling extension to inform the ingress router of an ability of the egress router to support the stitching procedure,
  wherein outputting a communication from an egress router comprises:
    allocating the non-null label to the LSP segment with the egress router when the egress router supports the stitching procedure;
    setting a "stitching ready" bit in a reservation (RESV) message as the explicit signaling mechanism to inform the ingress router of the LSP segment; and
    outputting the RESV message to include both the allocated non-null label and the "stitching ready" bit.

2. The method of claim 1, wherein receiving a communication from an ingress router comprises receiving a PATH message from the ingress router of the LSP segment.

3. The method of claim 2, wherein the PATH message includes a "stitching desired" bit that directs the egress router to prepare the LSP segment for the stitching procedure.

4. The method of claim 1, further comprising:
  receiving the signaling protocol as a PATH message from the ingress router; and
  performing label operations to stitch the LSP segment to establish an LSP in response to the PATH message.

5. The method of claim 4, further comprising determining whether the egress router of the LSP segment is an egress router of the LSP.

6. The method of claim 5, wherein performing label operations comprises allocating a null label to the LSP segment and to the LSP when the egress router of the LSP segment is the egress router of the LSP.

7. The method of claim 5, wherein performing label operations comprises:
  receiving a label from a subsequent router in the LSP when the egress router of the LSP segment is not the egress router of the LSP; and
  installing a route to swap a non-null label allocated to the LSP segment to the label from the subsequent router.

8. The method of claim 1, further comprising ignoring the request for the stitching procedure when the egress router does not recognize the stitching desired communication.

9. The method of claim 1, further comprising sending an error message from the egress router to the ingress router of the LSP segment when the egress router does not support the stitching procedure.

10. A method comprising:
  outputting a communication from an ingress router of a label switched path (LSP) segment to an egress router of the LSP segment, the communication indicating that a stitching procedure is desired to automatically stitch an LSP to the LSP segment; and
  receiving a communication from the egress router, the communication comprising: (i) a non-null label allocated to the LSP segment from the egress router, and (ii) an explicit signaling extension to inform the ingress router of an ability of the egress router to support the stitching procedure, wherein receiving a communication comprises receiving a reservation (RESV) message from the egress router of the LSP segment, and
  wherein the RESV message includes a "stitching ready" bit that informs the ingress router when the egress router supports the stitching procedure.

11. The method of claim 10, wherein outputting a communication comprises outputting a PATH message to the egress router of the LSP segment.

12. The method of claim 11, further comprising setting a "stitching desired" bit in the PATH message to direct the egress router to prepare the LSP segment for the stitching procedure.

13. The method of claim 10, further comprising:
receiving a PATH message;
forwarding the PATH message to the egress router of the LSP segment; and
performing label operations to stitch the LSP segment to establish an LSP in response to the PATH message.

14. The method of claim 13, wherein performing label operations comprises:
allocating a label to the LSP;
receiving a label from a subsequent router in the LSP segment; and
installing a route to swap the label allocated to the LSP to the label from the subsequent router.

15. The method of claim 10, further comprising receiving an error message from the egress router of the LSP segment when the egress router does not support the stitching procedure.

16. A router comprising:
a signaling protocol that establishes the router as an egress router within a label switched path (LSP) segment; and
a stitching module that receives a communication from an ingress router of the LSP segment that a stitching procedure is desired with the LSP segment to automatically stitch an LSP to the LSP segment, wherein the stitching module outputs a communication that includes a non-null label allocated to the LSP segment from the egress router and an explicit signaling extension to inform the ingress router of an ability of the egress router to support the stitching procedure,
wherein the stitching module allocates a non-null label to the LSP segment when the egress router supports the stitching procedure, and outputs a reservation (RESV) message in which the "stitching ready" bit is set to inform the ingress router that the LSP segment is ready for the stitching procedure.

17. The router of claim 16, wherein the stitching module receives a PATH message from the ingress router of the LSP segment, and outputs the communication in response to the PATH message, wherein the PATH message includes a "stitching desired" bit that directs the egress router to prepare the LSP segment for the stitching procedure.

18. The router of claim 17,
wherein the LSP segment comprises a Resource Reservation Protocol with Traffic Engineering extensions (RSVP-TE) LSP segment, and
wherein the "stitching desired" bit is defined for an Attributes Flags TLV in an LSP_Attributes object within the PATH message of the RSVP-TE LSP segment.

19. The router of claim 16,
wherein the LSP segment comprises a Resource Reservation Protocol with Traffic Engineering extensions (RSVP-TE) LSP segment, and
wherein the "stitching ready" bit is defined for a Record Route Object (RRO) Attributes sub-object in a RRO within the RESV message of the RSVP-TE LSP segment.

20. The router of claim 16, wherein the stitching module:
receives a PATH message from the ingress router;
determines whether the egress router of the LSP segment is an egress router of the LSP; and
performs label operations to stitch the LSP segment to establish an LSP in response to the PATH message.

21. The router of claim 20, wherein the stitching module allocates a null label to the LSP segment and to the LSP when the egress router of the LSP segment is the egress router of the LSP, and wherein the null label allocated to the LSP segment initiates penultimate hop popping (PHP) in the LSP segment.

22. The router of claim 20,
wherein the stitching module receives a label from a subsequent router in the LSP when the egress router of the LSP segment is not the egress router of the LSP,
wherein the signaling protocol installs a route to swap the non-null label allocated to the LSP segment to the label from the subsequent router, and
wherein the stitching module allocates a null label to the LSP to avoid double labeling the egress router of the LSP segment.

23. The router of claim 16, wherein the stitching module ignores the request for the stitching procedure when the stitching module does not recognize the stitching desired communication.

24. The router of claim 16, wherein the stitching module sends an error message to the ingress router of the LSP segment when the egress router does not support the stitching procedure, wherein the error message comprises a "routing problem" error code and a "stitching unsupported" error subcode.

25. A router comprising:
a signaling protocol that establishes the router as an ingress router of a label switched path (LSP) segment; and
a stitching module that outputs a communication to an egress router of the LSP segment that a stitching procedure is desired with the LSP segment, and receives a communication from the egress router that includes a label allocated to the LSP segment from the egress router and an explicit signaling extension indicating an ability of the egress router to support the stitching procedure,
wherein the stitching module receives a reservation (RESV) message from the egress router of the LSP segment, and wherein the RESV message includes the "stitching ready" bit that informs the ingress router when the egress router supports the stitching procedure.

26. The router of claim 25, wherein the stitching module outputs a PATH message to the egress router of the LSP segment to indicate that the stitching procedure is desired, and sets a "stitching desired" bit in the PATH message to direct the egress router to prepare the LSP segment for the stitching procedure.

27. The router of claim 26,
wherein the LSP segment comprises a Resource Reservation Protocol with Traffic Engineering extensions (RSVP-TE) LSP segment, and
wherein the "stitching desired" bit is defined for an Attributes Flags TLV in an LSP_Attributes object within the PATH message of the RSVP-TE segment.

28. The router of claim 25,
wherein the LSP segment comprises a Resource Reservation Protocol with Traffic Engineering extensions (RSVP-TE) LSP segment, and
wherein the "stitching ready" bit is defined for a Record Route Object (RRO) Attributes sub-object in a RRO within the RESV message of the RSVP-TE LSP segment.

29. The router of claim 25, wherein the stitching module receives a PATH message, forwards the PATH message to the egress router of the LSP segment, and performs label operations to stitch the LSP segment to establish an LSP in response to the PATH message.

30. The router of claim 29,
wherein the stitching module allocates a label to the LSP and receives a label from a subsequent router in the LSP segment, and
wherein the signaling protocol installs a route to swap the label allocated to the LSP to the label from the subsequent router.

31. The router of claim 25, wherein the stitching module receives an error message from the egress router of the LSP segment when the egress router does not support the stitching procedure, wherein the error message comprises a "routing problem" error code and a "stitching unsupported" error sub-code.

* * * * *